United States Patent

Krishnan et al.

[11] Patent Number: 6,107,375
[45] Date of Patent: Aug. 22, 2000

[54] HYDROLYSIS-STABLE POLYCARBONATE MOLDING COMPOSITION

[75] Inventors: Sivaram Krishnan, Pittsburgh; James B. Johnson, Washington; Donald K. Booher, Bethel Park, all of Pa.

[73] Assignee: Bayer Corporation, Pittsburgh, Pa.

[21] Appl. No.: 09/168,778

[22] Filed: Oct. 8, 1998

[51] Int. Cl.[7] .................................................. C08K 5/35
[52] U.S. Cl. ......................... 524/95; 524/97; 524/126; 524/128; 524/153
[58] Field of Search ............... 525/92, 147; 524/153, 524/95, 128, 97, 126

[56] References Cited

U.S. PATENT DOCUMENTS

| | | | |
|---|---|---|---|
| 3,305,520 | 2/1967 | Fritz | 524/153 |
| 3,609,118 | 9/1971 | Pilz et al. | 260/45.7 |
| 3,978,020 | 8/1976 | Liberti | 260/45.8 A |
| 4,590,241 | 5/1986 | Hohlfeld | 525/132 |
| 4,895,897 | 1/1990 | Kaufman | 525/67 |
| 5,028,640 | 7/1991 | Shimaoka et al. | 524/95 |
| 5,055,523 | 10/1991 | Inoue et al. | 525/147 |
| 5,179,161 | 1/1993 | Saito | 525/92 |
| 5,274,034 | 12/1993 | Morgan et al. | 525/67 |
| 5,756,621 | 5/1998 | Rösch et al. | 526/260 |
| 5,849,820 | 12/1998 | Kim et al. | 524/95 |
| 6,031,031 | 2/2000 | Weber et al. | 524/95 |

*Primary Examiner*—Veronica P. Hoke
*Attorney, Agent, or Firm*—Joseph C. Gil; Aron Preis

[57] ABSTRACT

A thermoplastic composition featuring an improved resistance to hydrolysis is disclosed. The composition comprises (i) thermoplastic polycarbonate resin (ii) about 0.01 to 3 percent of a compound selected from the group consisting of phosphite and phosphonite and (iii) an additive amount of an oligomer or polymer the structure of which features at least one pendant cyclic iminoether group per molecular chain. The additive amount is that which is sufficient to improve the resistance of the polycarbonate resin to hydrolysis.

5 Claims, No Drawings

HYDROLYSIS-STABLE POLYCARBONATE MOLDING COMPOSITION

FIELD OF THE INVENTION

The invention relates to thermoplastic molding compositions and more particularly to polycarbonate molding compositions.

SUMMARY OF THE DISCLOSURE

A thermoplastic composition featuring an improved resistance to hydrolysis is disclosed. The composition comprises (i) thermoplastic polycarbonate resin (ii) about 0.01 to 3 percent of a compound selected from the group consisting of phosphite and phosphonite and (iii) an additive amount of an oligomer or polymer, the structure of which features at least one pendant cyclic iminoether group per molecular chain. The additive amount is that which is sufficient to improve the resistance of the polycarbonate resin to hydrolysis.

TECHNOLOGICAL BACKGROUND

It is known in the art to incorporate in phosphorous compounds in polymeric resins. Thermal stabilization of polyesters has been reported in U.S. Pat. No. 3,609,118 to be attained by incorporating certain phosphines or certain phosphinic acid esters. Polycarbonate compositions containing minor amounts of phosphonite have been disclosed in U.S. Pat. No. 3,978,020. These compositions are said to exhibit improved thermal stability. Also known are polycarbonate compositions containing phosphites.

It has, however, long been recognized that such compositions, which contain these phosphorous compounds as additives, are susceptible to hydrolysis. Temperature and/or pressure accelerate this effect, evidenced by a decrease of the molecular weight. The degree of degradation may be determined and quantified by measurement of melt flow.

Corrective measures have been often sought.

The efficacy of oxazoline-containing additives in the context of polymeric resins, including polycarbonates, has been previously disclosed. Among the relevant documents, mention may be made of U.S. Pat. No. 4,895,897, which disclosed a polycarbonate containing thermoplastic molding composition having improved impact performance. The composition contains a functionalized elastomer which is the reaction product of (i) an ethylene elastomer having at least one reactive polar group and (ii) oxazoline-functionalized polystyrene. Surfaces with high gloss are said in U.S. Pat. No. 5,274,034 to characterize parts molded from a polycarbonate composition. This composition also contains aromatic polycarbonate with reactive carboxylic acid group and styrene-based polymer with repeating units containing pendant cyclic iminoether groups.

The polymers and oligomers of olefinically unsaturated hydrocarbons containing oxazolinyl end groups have been disclosed in U.S. Pat. No. 5,756,621 for their utility as compatibilizers in polymer blends. Also relevant is U.S. Pat. No. 4,590,241, which disclosed a compatible blend of thermoplastic resins. The blend contains a reactive polymer having repeating units containing pendant cyclic iminoether groups. That polymer is reacted to form a linkage and a compatible blend with a thermoplastic polymer containing a co-reactive group.

DETAILED DESCRIPTION OF THE INVENTION

The hydrolysis-stable, preferably transparent, composition in accordance with the present invention comprises (i) thermoplastic polycarbonate resin
(ii) about 0.01 to 3, preferably about 0.05 to 2, percent, relative to the weight of the composition of at least one member selected from the group consisting of phosphite and phosphonite, and
(iii) an additive amount of an oligomer or polymer, the structure of which features at least one pendant cyclic iminoether group per molecular chain, said amount being sufficient to improve the resistance of the polycarbonate composition to hydrolysis.

The improvement is in comparison to a composition from which said (iii) is excluded.

Suitable polycarbonate resins for preparing the copolymer of the present invention are homopolycarbonates and copolycarbonates and mixtures thereof.

The polycarbonates generally have a weight average molecular weight of 10,000 to 200,000, preferably 15,000 to 80,000 and their melt flow rate, per ASTM D-1238 at 300° C., is about 1 to about 85 g/10 min., preferably about 2 to 24 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

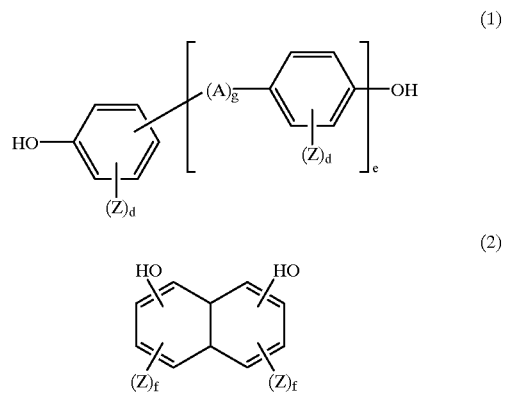

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —$SO_2$— or a radical conforming to

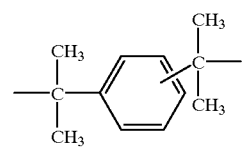

e and g both denote the number 0 to 1;
Z denotes F, Cl, Br or $C_1$–$C_4$-alkyl and if several Z radicals are substituents in one aryl radical, they may be identical or different from one another;

d denotes an integer from 0 to 4; and f denotes an integer from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, dihydroxydiphenyl cycloalkanes, and α,α-bis-(hydroxyphenyl)-diisopropyl-benzenes, as well as their nuclear-alkylated compounds. These and further suitable aromatic dihydroxy compounds are described, for example, in U.S. Pat. Nos. 5,227,458, 5,105,004; 5,126,428; 5,109,076; 5,104,723; 5,086,157; 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, α,α'-bis-(3,5-dimethyl-4-hydroxyphenyl)-p-diisopropyl-benzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention is phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxy compounds. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxy compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5 to 24, 13 to 16, 7.5 to 13.0 and 3.5 to 6.5 g/10 min., respectively. These are products of Bayer Corporation of Pittsburgh, Pa.

A polycarbonate resin suitable in the practice of the invention is known and its structure and methods of preparation have been disclosed, for example, in U.S. Pat. Nos. 3,030,331; 3,169,121; 3,395,119; 3,729,447; 4,255,556; 4,260,731; 4,369,303 and 4,714,746 all of which are incorporated by reference herein.

The phosphorous compound useful in the present context is a member selected form the group consisting of aromatic phosphite, aliphatic phosphite and aromatic phosphonites.

Suitable phosphites are compounds conforming to

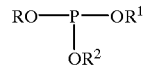

where R, $R^1$ and $R^2$, independently one of the others, denote $C_{1-4}$-alkyl, $C_{5-6}$-cycloalkyl, oxetanyl or an aromatic radical. The radicals may be substituted or unsubstituted.

Phosphonites are compounds conforming to

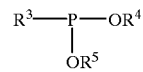

where $R^3$ denotes an aromatic, preferably a biphenyl radical, and $R^4$ and $R^5$ independently are aromatic radicals, which may optionally be substituted by alkyl groups.

The stabilizer suitable in the context of the invention is an oligomer or polymer which melts at a temperature equal to or lower than the melt temperature of polycarbonate, and is capable of being compounded with polycarbonate resin in the molten state, the structure of which features at least one pendant cyclic iminoether, preferably oxazoline, group per molecular chain. Such compounds are known and are readily available in commerce. Preparation of suitable stabilizers has been disclosed in, for instance, in U.S. Pat. Nos. 3,505,297 and 5,756,621, the specifications of which are incorporated herein by reference.

The stabilizer of the invention is required to contain in its structure an amount of cyclic iminoether groups sufficient to improve the resistance of the composition against hydrolytic degradation, as such is evidenced by decrease in the molecular weight of the polycarbonate resin. More typically, it is required to contain about 0.01 to 10, preferably 0.1 to 5, percent by weight of units containing pendant cyclic iminoether groups.

The cyclic iminoether groups are advantageously described by the general structure

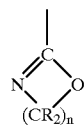

wherein each R is independently hydrogen, or an inertly substituted hydrocarbon containing 18 or fewer carbon atoms; and n is a number from about 1 to about 5. Said cyclic iminoether group can be attached to the polymer chains through any of the carbon atoms in the ring. Preferably, the cyclic iminoether is a 2-iminoether, i.e., is attached to the polymer chain through the 2-carbon atom to yield a structure as represented as

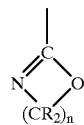

wherein R and n are as defined hereinbefore. Preferably, each R is hydrogen or lower alkyl and n is 1, 2 or 3. Most preferably, each R is hydrogen, n is 2 and the cyclic iminoether is a 2-oxazoline group. By "inertly substituted", it is meant that the referenced group contains no functional group which interferes with the polymerization or curing of the oxazoline group.

Polymers containing repeating units having pendant cyclic iminoether groups are advantageously prepared by the polymerization of a monomer mixture comprising an ethylenically unsaturated monomer containing a cyclic iminoether group. Preferably, such a monomer is a 2-alkenyl-2-oxazoline wherein said alkenyl group contains from about 2 to about 8, preferably 2 to 4 carbon atoms. Most preferably, said monomer is 2-isopropenyl-2-oxazoline.

The first reactive polymer is a polymer of any monomer, which (a) can be modified to contain pendant cyclic iminoether groups, or (b) can be copolymerized with a monomer, which contains or can be modified to contain a pendant cyclic iminoether group. In the preferred embodiment, wherein an ethylenically unsaturated cyclic iminoether is employed as a monomer, the first reactive polymer is advantageously a polymer of an additional polymerizable monomer copolymerizable therewith.

Said first reactive polymer is advantageously a polymer of a lower alkene, particularly a $C_1$–$C_8$-alkene, more particularly, ethylene or propylene as well as copolymers thereof; a conjugated diene such as butadiene or isoprene as well as copolymers thereof; vinyl acetate; an ether of an α,β-ethylenically unsaturated carboxylic acid such as alkyl esters of acrylic or methyl acrylic acid and copolymers thereof; a monovinylidene aromatic compound such as styrene, vinyltoluene, t-butyl styrene, vinylnaphthalene and the like; as well as polymers of diverse other addition polymerizable monomers. Ethylenically unsaturated cyclic iminoethers, in particular, 2-alkenyl-2-oxazolines, generally resemble styrene in their polymerization reactions. Accordingly, as a rule of thumb, polymers of monomers, which are copolymerizable with styrene, will generally be usefully employed herein.

A particularly useful stabilizer in accordance with the invention is represented by the following structural formulas:

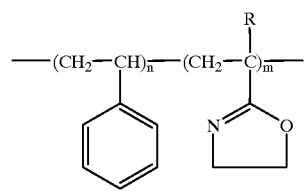

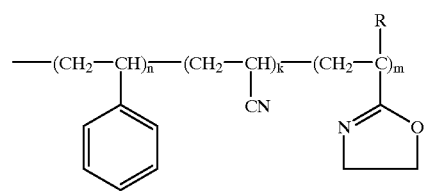

where R is hydrogen, $C_3$–$C_8$ alkyl, $C_5$–$C_{10}$ cycloalkyl or an aryl group, preferably a methyl group; k, n and m are selected such that the oxazoline group constitutes about 1 to 15%, preferably 2 to 7% by weight relative to the weight of the stabilizer; and where the weight average molecular weight of the stabilizer is about 500 to 200,000, preferably 50,000 to 150,000.

Examples of the preferred embodiments entail a member selected from the group consisting of styrene/2-isopropenyl-2-oxazoline copolymer and acrylonitrile/2-isopropenyl-2-oxazoline/styrene terpolymer.

The stabilizer useful in the inventive composition is added in an amount sufficient to improve the resistance of the polycarbonate resin to hydrolysis; the improvement set in comparison to the resistance of a corresponding polycarbonate composition from which the stabilizer is excluded. Preferably, the stabilizer is present in an amount of 0.01 to 3%, preferably 0.02 to 2% relative to the weight of the composition.

The improved stabilization characteristic of the inventive composition may be determined by measuring the increase in its melt flow rate (MFR). Advantageously, MFR may be determined in accordance with ASTM D-1238 under the conditions stated in the table below. Stabilized compositions have a lower MFR than do corresponding, un-stabilized compositions under similar hydrolysis conditions.

The stabilized compositions of the invention may contain other conventional additives for their art-recognized functions. These include dyes, other pigments, reinforcing agents and fillers, flame-retardants and hydrolysis and UV stabilizers, plasticizers and mold release agents.

The preparation of the stabilized compositions of the invention is conventional.

The invention is further illustrated but is not intended to be limited by the following examples in which all parts and percentages are by weight unless otherwise specified.

EXAMPLES

Stabilized compositions in accordance with the invention have been prepared and their properties determined. The table below provides a summary of the makeup of the compositions and their properties. The polycarbonate used in preparing the compositions exemplified below was Makrolon 3108, a homopolycarbonate based on Bisphenol A, a product of Bayer Corporation, having a MFR of about 5.6 gm/10 minutes.

The phosphorous compounds used in the examples were included, were indicated, at a level of 0.1% by weight relative to the weight of the composition. The identity of the phosphorous compounds were:

E—denotes a 3-hydroxymethyl 3-ethyl oxetanyl phosphite;

P—denotes bis-(2,4-di-t-butyl phenyl)biphenyl phosphonite; and

I—denotes tris-(2,4-di-t-butyl phenyl)phosphite.

The stabilizer used in the examples was styrene/2-isoproprenyl oxazoline copolymer having a weight average molecular weight of 150,000 and containing about 5% oxazoline. The stabilizer was incorporated, where indicated, at a level of 1% relative to the weight of the composition.

The MFR values (determined at 300° C., 1.2 Kg load, per ASTM D-1238) on molded parts were determined after subjecting these parts to hydrolysis at 120° C., @ 15 atmospheres pressure, for the indicated time. Yellowness indices (YI) were determined in accordance with ASTM D-1925. Total Light Transmission (TLT) has been determined in accordance with ASTM D-1003 using test specimens 0.125 inch (3.2 mm) in thickness.

TABLE

| Ex. | phosphorous compound | Stabilizer | before aging | MFR* 6 | 12 | 24 | YI | TLT (%) |
|---|---|---|---|---|---|---|---|---|
| 1 | — | — | 5.6 | 6.6 | 6.7 | 6.2 | 3.2 | 89.3 |
| 2 | E | — | 6.8 | 14.2 | 31.4 | 49.3 | 2.5 | 89.5 |
| 3 | E | 1.0 | 6.5 | 9.7 | 15.5 | 12.7 | 3.6 | 88.5 |
| 4 | P | — | 6.2 | 10.5 | 20.8 | 52 | 2.9 | 89.7 |
| 5 | P | 1.0 | 6.2 | 9 | 13.4 | 26.6 | 2.7 | 88.9 |
| 6 | I | — | 5.6 | 8.9 | 14.8 | 26.6 | 2.1 | 90.3 |
| 7 | I | 1.0 | 6 | 7.1 | 9.6 | 11.1 | 2.6 | 89.5 |

*the MFR values are determined after the indicated number of hours of subjecting the composition to the hydrolysis as noted above.

The results show the improved resistance to hydrolysis (degradation due to exposure to water) imparted the composition by the inclusion of the stabilizer of the invention.

Although the invention has been described in detail in the foregoing for the purpose of illustration, it is to be understood that such detail is solely for that purpose and that variation can be made therein by those skilled in the art without departing from the spirit and scope of the invention except as it may be limited by the claims.

What is claimed is:

1. A thermoplastic composition comprising (A) a resinous blend and (B) about 0.01 to 3 percent of at least one member selected from the group consisting of phosphite and phosphonite, said resinous blend consisting of thermoplastic polycarbonate resin, and about 0.02 to 2 percent of an oligomer or polymer, the structure of which features at least one pendant cyclic iminoether group per molecular chain, said percent, both occurrences, being relative to the total weight of the composition.

2. The composition of claim 1 wherein said (B) is present in an amount of about 0.05 to 2.0 percent.

3. The composition of claim 1 wherein said member is a phosphite.

4. The composition of claim 1 wherein said member is a phosphonite.

5. The composition of claim 1 wherein (the polymer) is at least one member selected from the group consisting of styrene/2-isopropenyl-2-oxazoline copolymer and acrylonitrile/2-isopropenyl-2-oxazoline/styrene terpolymer.

* * * * *